Feb. 24, 1948.  D. W. MACHIN  2,436,723
LOADING DEVICE ATTACHMENT FOR TRACTORS
Filed June 15, 1946  2 Sheets-Sheet 1
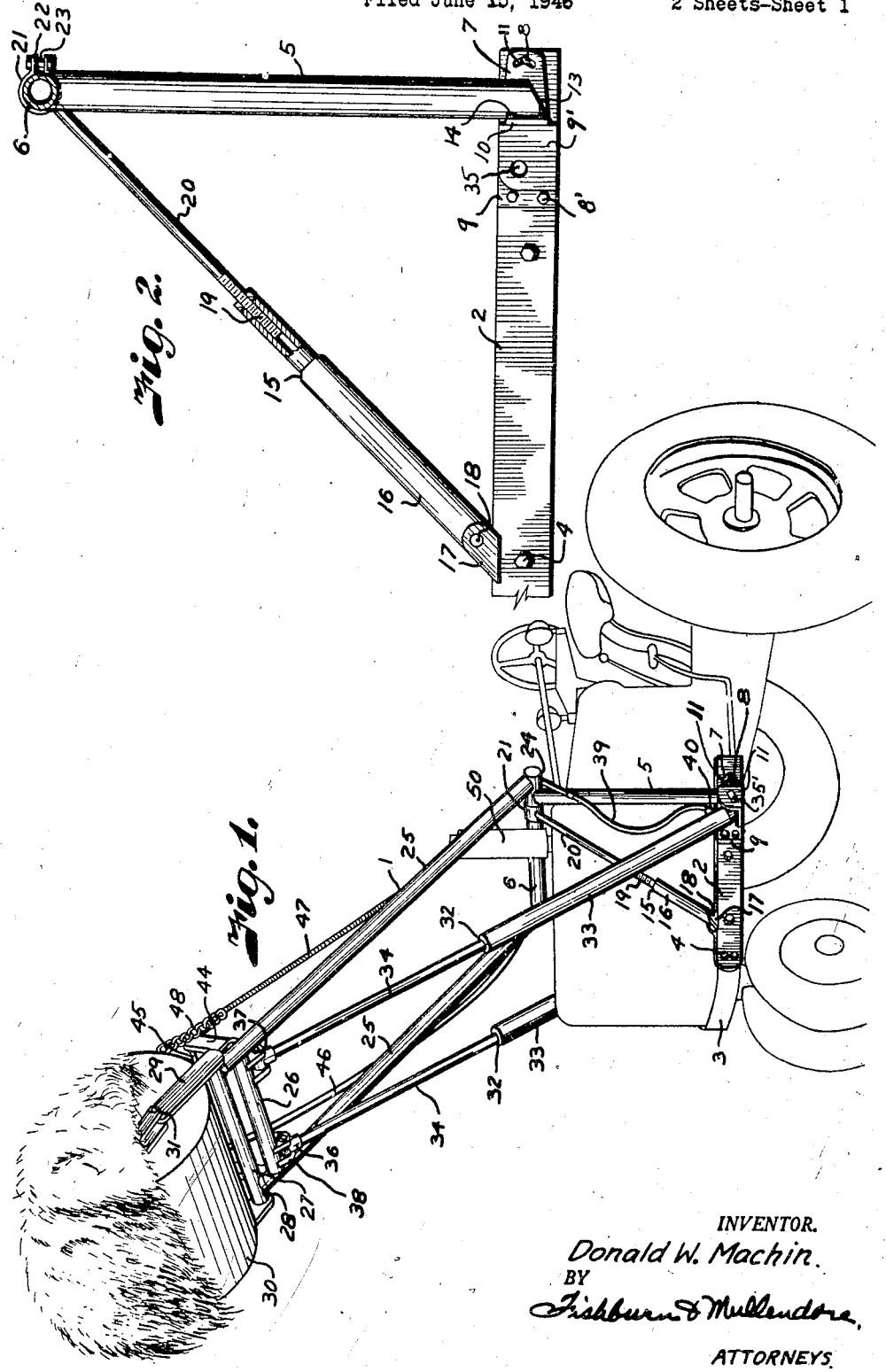
INVENTOR.
Donald W. Machin
BY
ATTORNEYS

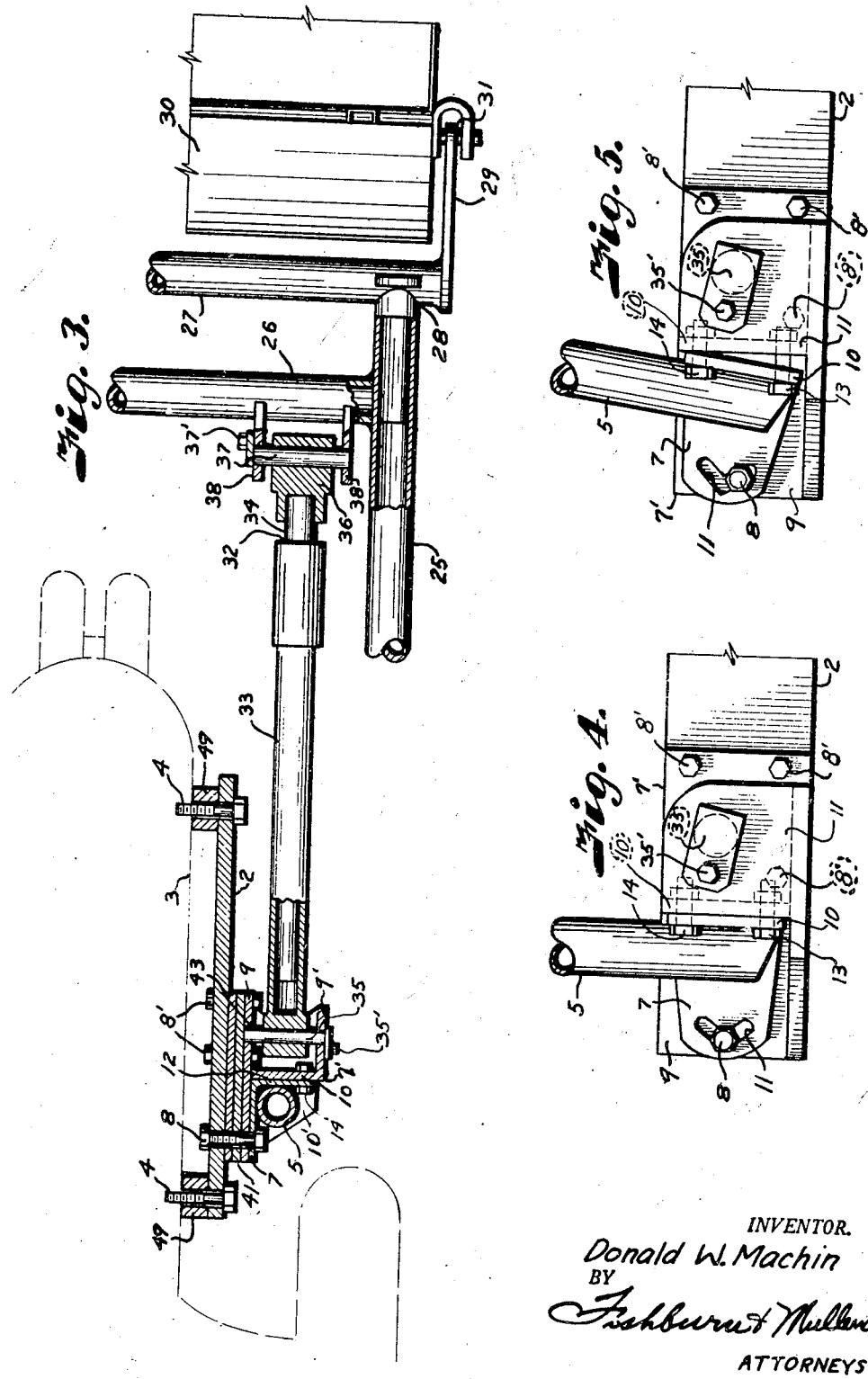

Patented Feb. 24, 1948

2,436,723

UNITED STATES PATENT OFFICE 2,436,723

LOADING DEVICE ATTACHMENT FOR TRACTORS

Donald W. Machin, Ottawa, Kans., assignor to Ottawa Steel Products, Inc., Ottawa, Kans., a corporation of Kansas Application June 15, 1946, Serial No. 676,991

8 Claims. (Cl. 214—140)

This invention relates to improvements in loaders, and more particularly to an attachment for tractors or the like operated from the front end thereof by power derived from the tractor for picking up, transporting and unloading materials.

This invention is particularly adapted for attachment to farm tractors for picking up fertilizer which necessarily accumulates around a barn yard, loading the same into a vehicle for spreading of same on the land, and for the picking up of earth or other silicious, carboniferous or calcareous material, hay, farm crops and grain or any other bulky material and elevating the same for transportation to a place of deposit and there unloading the same. Devices of this kind are great labor savers which are very important under present conditions of labor shortage.

It is the principal object of the present invention to provide a loader having an adjustable frame which may be attached to tractors of different make and dimension so that the loader may be readily attached thereto.

Other objects of the present invention are to provide a device for mounting upon a tractor or the like which will function to pick up, elevate, transport and deposit a load to a desired place controlled by the operator from the seat of the tractor by hydraulically operating power means; to provide a device of this character with few structural elements which will not interfere with the vision of the operator of the tractor during operation of the implement; to provide a device of this character having an adjustable frame to avoid interference with parts of the tractor upon which it is mounted; to provide adjustment of the frame so that the dip and rise of the bucket or load lifting means may be varied with respect to the height of the tractor and grade levels; to provide a device of this character providing for a very high lift in order to elevate the load as may be necessary in depositing the material where desired; to provide a device having a fast lifting operation; to provide a device of this character wherein a load may be raised to any desired position and held in that position for transporting to a place of deposit; to provide a device of this character easily and quickly attached to and detached from a tractor and which, when attached to the tractor, is compact and easily transported through barn doors and the like or any places where the tractor is required to operate; and to provide a device of this character simple, economical to manufacture, and efficient in operation.

In accomplishing these and other objects of the present invention, I have provided improved details of structure, the preferred forms of which are illustrated in the accompanying drawings wherein:

Fig. 1 is a perspective view of my loader showing the same attached to a tractor or the like.

Fig. 2 is a side view of the frame with parts broken away to better illustrate the adjustable structure.

Fig. 3 is a plan view partly in section particularly illustrating the attachment of the device to a tractor.

Fig. 4 is a side view of the adjustable bracket showing the upright in vertical position.

Fig. 5 is a view similar to Fig. 4 showing the upright in slightly tilted position.

Referring more in detail to the drawings:

I designates a loader embodying the features of my invention having side rails 2 adapted to be attached to the body of a tractor 3 by bolts or the like 4. The side rails 2 are of such length to extend from substantially the forward end of the body member 3 rearwardly to slightly past the center of the body member as best illustrated in Fig. 1 to afford a rigid support to the structure and efficient bracing against endwise thrusts as transmitted by the action of the power lifting means during working operation of the device.

Carried by the rear portion of the side rails 2 are uprights 5 connected at their upper ends by a cross bar 6 which extends across the top of the tractor unit forming a gantry. The lower ends of the uprights are secured to brackets 7 which are adjustably mounted on a box 7' secured to the side rails by bolts 8 and 8'. The box 7' includes a back member 9 through which the fastening bolts 8 and 8' extend, a bracket member having an outer side 9', back 10 and bottom 10', all welded to the back member 9 to form a rigid structure. The bolts 8 extend through substantially V-shaped slots 11 in the brackets 7 near the outer end thereof for adjustment of the brackets as will later be shown. The forward portion of the bracket 7 is provided with an outwardly turned flange 12 adapted to be secured to the back 10 of the box 7' by bolts or the like 13 and 14 as best illustrated in Fig. 4. The uprights 5 are secured to the brackets 7 in any suitable manner, such as by welding, and preferably rest on the bottom of the box 7' and against the flange 12 of the bracket 7 to provide a rigid structure.

The uprights 5 are further supported by braces 15 comprising tubular members 16 having their lower ends pivotally secured to ears 17 by a pin or the like 18, the ears being located substantially forwardly on the side rails 2. The upper end of the tubular member 16 is internally threaded and adapted to receive the threaded end 19 of a rod 20 having its upper end attached to the cross member 6 by a clamp 21 having arms 22 and bolt 23 for securing the upper end of the braces rigidly to the cross member.

The outer ends of the cross bar 6 are provided with trunnions 24 for fulcruming the rear ends of a pair of load lifting arms or radius members 25. The radius members 25 are rigidly connected near their forward ends with a cross bar 26. A bail or yoke member 27 is rigidly secured to the forward ends of the radius members as indicated at 28. The yoke member has forwardly extending arms 29 adapted to pivotally support a load lifting devise 30, pivotally connected to the forward ends of the arms as indicated at 31.

Laterally arranged and substantially longitudinally extending rams 32 are provided at each side of the tractor body which comprise elongated tubular cylinders 33 having pistons or plungers 34 which telescope into the forward ends of the hydraulic cylinders and having a fluid-tight fit with the inner walls thereof. The rear ends of the cylinders are pivotally supported in the bracket 11 secured to the side rails 2 by pins or the like 35 as best illustrated in Fig. 3. The pin 35 has a head adapted to receive a stud bolt 35' engaging the bracket 11 for holding the pin 35 in position. Secured to the forward ends of the plungers 34 are bearing members 36 adapted to receive a pin 37 carried by bracket arms 38 pivotally connecting the forward ends of the plungers to the cross bar 26. The pin 37 has a head adapted to receive a stud bolt 37' engaging the bracket 38 for holding the pin 37 in position. By reference to Fig. 3 it will be noted that the bearing member has lateral movement on the pin 37 to prevent twisting or distortion of the plungers and cylinders due to strains and stresses during the load lifting operation.

A conventional type of pumping unit (not shown) is provided for supplying fluid to the hydraulic cylinders through tubing 39 connected to the rear portion of the cylinders behind the plungers as indicated at 40 (Fig. 1), the tubing 39 leading to a fluid supply (not shown). Details of the motor, drive and control mechanism have not been illustrated as they are not material to the present invention.

Referring specifically to the adjustability of the device so that it may be attached to tractors of different types or sizes, in Fig. 3 I have illustrated a plurality of spacing plates 41 adapted to lie between the side rail 2 and the back 9 of the box 7' and are secured thereto by bolts 8 and 8'. While I have here illustrated two of the adjusting plates, none or any number may be used as desired. The back 9 of the box 7' is provided with an opening to accommodate the inner end of the pin 35 as indicated at 43 (Fig. 3).

Also carried by the front ends of the load lifting arms 25 are brackets 44 having a cross bar 45 for carrying a lever (not shown) for operating a latching and dumping mechanism carried by the rear of the load lifting means (not shown). Attached to the lever is a line 46 which extends to the control mechanism (not shown) for convenience of the operator of the device in dumping the load from the load lifting means.

Attached to the load lifting arms or radius members 25 are springs 47 having their opposite ends attached to the load lifting means by a short piece of chain 48 for returning the shovel to loading position after the dumping operation and in its latching position.

Operation of a device constructed and assembled as described is as follows:

First referring to application of the loader to the tractor, the framework is placed over the frame of the tractor and the side rails 2 fastened to the body member 3 by bolts 4. If desired, spacing members 49 may be placed between the side rails 2 and the body 3 of the tractor, and the desired number of plates 41 inserted between the rails 2 and the back 9 of the box 7'. The uprights 5 may be adjusted to the proper position by adjustment of the rod 20 with respect to the threaded tubular member 16 of the bracing bar 15 and loosening of the bolts 8 which hold the bracket 7 to the side rail and also loosening the bolts 13 and 14 so that the framework may be tilted forwardly or backwardly. It will be noted that by greater loosening of the bolt 13 the framework is tilted forwardly as best illustrated in Fig. 5. Backward tilting of the structure would be just the opposite, that is, by loosening of the bolt 14 to a greater extent than the bolt 13. This adjustable feature is particularly adaptable for use with tractors having structures above the body as indicated at 50 (Fig. 1) so that the cross bar will avoid contact with such structure, and for varying the rise and dip of the bucket or load lifting means with respect to the height of the tractor and grade levels.

Release of fluid in the cylinders 33 behind the plungers 34 will cause lowering of the load lifting means to load filling position. Forward movement of the tractor will load the load lifting means or bucket with whatever material is desired and pressure on the fluid to cause it to flow to the cylinders will cause the plungers to be moved forwardly in the cylinders to raise the load lifting means and be guided upwardly by the radius members 25 to the desired elevation so that the load may be deposited where desired.

I do not wish to be limited to any particular load lifting means as buckets, manure forks, hay rakes and the like are adaptable for use with my loader attachment.

It will be obvious from the foregoing that I have provided an improved loading attachment for tractors which may be quickly and easily attached to and detached from a tractor or other vehicle and which is adjustable to different makes of tractors.

What I claim and desire to secure by Letters Patent is:

1. A loader attachment for tractors comprising, a frame including vertical members, means for adjustably attaching the frame to opposite sides of the tractor frame, trunnions extending outwardly from the upper ends of the vertical members, load lifting arms having their rear ends pivotally mounted on said trunnions, a cross member rigidly connecting the load lifting arms adjacent the forward ends thereof, material carrying means pivotally carried by the outer ends of the arms, hydraulic cylinders pivoted adjacent the lower ends of the vertical members and provided with plunger rods projecting forwardly to the front of the tractor, means for pivotally connecting the forward ends of the plungers to the cross member intermediate the load lifting arms, means for providing lateral movement of the forward ends of said plungers, and hydraulic connections adjacent the pivoted ends of said hydraulic cylinders for applying fluid pressure thereto for actuating the plungers and lifting the material carrying means.

2. A power lift attachment for tractors comprising, a frame including side rails and vertical members, means for adjustably attaching the side rails to opposite sides of the tractor frame, a cross bar connecting the upper ends of the vertical members, an adjustable brace member connecting said cross member to the forward portions of said side rails, an adjustable bracket attached to said means for attaching the side rails to the frame, means for attaching the lower ends of the vertical members to said adjustable bracket, trunnions extending outwardly from the upper ends of the vertical members, load lifting arms having their rear ends pivotally mounted on said trunnions, a cross member rigidly connecting the load lifting arms adjacent the forward ends thereof, material carrying means pivotally carried by the outer ends of the arms, hydraulic cylinders pivoted adjacent the lower ends of the vertical members and provided with plunger rods projecting forwardly to the front of the tractor, means for pivotally connecting the forward ends of the plungers to the cross member intermediate the load lifting arms, means for providing lateral movement of the forward ends of said plungers, and hydraulic connections adjacent the pivoted ends of said hydraulic cylinders for applying fluid pressure thereto for actuating the plungers and lifting the material carrying means.

3. A loader attachment for tractors comprising, a frame including side rails, means for attaching the frame to opposite sides of the tractor frame, said means including plates to adjust the width of said frame to fit tractors of different sizes, box members secured to said rails, a bracket adjustably carried by said box member and said rails, vertical members having their lower ends secured to said adjustable bracket, a cross bar connecting the upper ends of the vertical members, trunnions on said cross member extending outwardly from the upper ends of the vertical members, an adjustable brace member having one end connected to said cross member and its lower end forwardly of said side rails whereby said vertical members may be tilted forwardly or backwardly with respect to the tractor by movement of said adjustable bracket and changing the length of said brace member, load lifting arms having their rear ends pivotally mounted on said trunnions, a cross member rigidly connecting the load lifting arms adjacent the forward ends thereof, material carrying means pivotally carried by the outer ends of the arms, hydraulic cylinders having their rear ends pivoted in said bracket attached to the side rails, said cylinders being provided with plunger rods projecting forwardly in front of the tractor, means for pivotally connecting the forward ends of the plunger rods to the cross member intermediate the load lifting arms, and hydraulic connections adjacent the pivoted ends of said hydraulic cylinders for applying fluid pressure thereto for actuating the plungers and lifting the material carrying means.

4. A loader attachment for tractors comprising, a frame including side rails, means for attaching the frame to opposite sides of the tractor frame, said means including plates to adjust the width of said frame to fit tractors of different sizes, box members secured to said rails, a bracket adjustably attached to said box members, vertical members having their lower ends secured to said adjustable bracket, a cross bar connecting the upper ends of the vertical members, trunnions on said cross member extending outwardly from the upper ends of the vertical members, an adjustable brace member having one end connected to said cross member and its lower end forwardly of said side rails whereby said vertical members may be tilted forwardly or backwardly with respect to the tractor by movement of said adjustable bracket and changing the length of said brace member, load lifting arms having their rear ends pivotally mounted on said trunnions, a cross member rigidly connecting the load lifting arms adjacent the forward ends thereof, material carrying means pivotally carried by the outer ends of the arms, hydraulic cylinders having their rear ends pivoted in said bracket attached to the side rails, said cylinders being provided with plunger rods projecting forwardly in front of the tractor, means for pivotally connecting the forward ends of the plunger rods to the cross member intermediate the load lifting arms, means for providing lateral movement of the forward ends of said plungers, and hydraulic connections adjacent the pivoted ends of said hydraulic cylinders for applying fluid pressure thereto for actuating the plungers and lifting the material carrying means.

5. A loader attachment for tractors comprising, a frame including vertical members, means for adjustably attaching the frame to opposite sides of the tractor frame, trunnions extending outwardly from the upper ends of the vertical members, load lifting arms having their rear ends pivotally mounted on said trunnions, material carrying means carried by the outer ends of the arms, hydraulic cylinders pivoted adjacent the lower ends of the vertical members and provided with plunger rods projecting forwardly therefrom, means for pivotally connecting the forward ends of the plungers to the load lifting arms, and hydraulic connections adjacent the pivoted ends of said hydraulic cylinders for applying fluid pressure thereto for actuating the plungers and lifting the material carrying means.

6. A power lift attachment for tractors comprising, a frame including side rails and vertical members, means for adjustably attaching the side rails to opposite sides of the tractor frame, a cross bar connecting the upper ends of the vertical members, an adjustable brace member connecting said cross member to the forward portions of said side rails, an adjustable bracket attached to said means for attaching the side rails to the frame, means for attaching the lower ends of the vertical members to said adjustable bracket, load lifting arms having their rear ends pivotally mounted adjacent the upper ends of the vertical members, material carrying means carried by the outer ends of the arms, hydraulic cylinders provided with plunger rods projecting forwardly of the tractor, means pivotally mounting the hydraulic cylinders on said side rails, means for pivotally connecting the forward ends of the plungers to the load lifting arms, means for providing lateral movement of the forward ends of said plungers, and hydraulic connections adjacent the pivoted ends of said hydraulic cylinders for applying fluid pressure thereto for actuating the plungers and lifting the material carrying means.

7. A loader attachment for tractors comprising, a frame including side rails, means for attaching the frame to opposite sides of the tractor frame, said means including plates to adjust the width of said frame to fit tractors of different sizes, box members secured to said rails, a bracket adjustably carried by said box member and said rails, vertical members, trunnions on said cross member, an adjustable brace member having one end connected to said cross member and its lower end forwardly of said side rails whereby said vertical members may be tilted forwardly or backwardly with respect to the tractor by movement of said adjustable bracket and changing the length of said brace member, load lifting arms having their rear ends pivotally mounted on said trunnions, material carrying means carried by the outer ends of the arms, hydraulic cylinders having their rear ends pivoted in said bracket attached to the side rails, said cylinders being provided with plunger rods projecting forwardly therefrom, means for pivotally connecting the forward ends of the plunger rods to the load lifting arms, and hydraulic connections adjacent the pivoted ends of said hydraulic cylinders for applying fluid pressure thereto for actuating the plungers and lifting the material carrying means.

8. A loader attachment for tractors comprising, a frame including side rails, means for attaching the frame to opposite sides of the tractor frame, said means including plates to adjust the width of said frame to fit tractors of different sizes, box members secured to said rails, a bracket adjustably attached to said box members, vertical members having their lower ends secured to said adjustable bracket, a cross bar connecting the upper ends of the vertical members, trunnions on said cross member, an adjustable brace member having one end connected to said cross member and its lower end forwardly of said side rails whereby said vertical members may be tilted forwardly or backwardly with respect to the tractor by movement of said adjustable bracket and changing the length of said brace member, load lifting arms having their rear ends pivotally mounted on said trunnions, material carrying means carried by the outer ends of the arms, hydraulic cylinders having their rear ends pivoted in said bracket attached to the side rails, said cylinders being provided with plunger rods projecting forwardly therefrom, means for pivotally connecting the forward ends of the plunger rods to the load lifting arms, means for providing lateral movement of the forward ends of said plungers, and hydraulic connections adjacent the pivoted ends of said hydraulic cylinders for applying fluid pressure thereto for actuating the plungers and lifting the material carrying means.

DONALD W. MACHIN.

REFERENCES CITED

The following references are of record in the file of this patent:

UNITED STATES PATENTS

| Number | Name | Date |
| --- | --- | --- |
| 1,371,344 | Brackett | Mar. 15, 1921 |
| 1,517,201 | Easley | Nov. 25, 1924 |
| 2,391,224 | Carter | Dec. 18, 1945 |
| 2,398,119 | Sauder | Apr. 9, 1946 |
| 2,417,021 | Simmonds | Mar. 4, 1947 |